United States Patent
Mimlitch

Patent Number: 5,467,108
Date of Patent: Nov. 14, 1995

[54] ADJUSTABLE POINTING STICK ASSEMBLY

[75] Inventor: Kenneth H. Mimlitch, Lexington, Ky.

[73] Assignee: Lexmark International, Inc., Greenwich, Conn.

[21] Appl. No.: 196,629

[22] Filed: Feb. 15, 1994

[51] Int. Cl.[6] .................................................. G09G 3/02
[52] U.S. Cl. ................................... 345/161; 74/471 XY
[58] Field of Search ................................ 200/5 R, 6 A, 200/331; 74/471 X; 345/161, 156, 157; 273/148 B; 178/18, 19

[56] References Cited

U.S. PATENT DOCUMENTS

| | | | |
|---|---|---|---|
| 4,297,542 | 10/1981 | Shumway | 200/5 R |
| 4,488,017 | 12/1984 | Lee | 200/5 R |
| 4,597,681 | 7/1986 | Hodges | 200/331 |
| 4,658,666 | 4/1987 | Liu | 74/471 X |
| 4,680,577 | 7/1987 | Straayer et al. | 345/168 |
| 4,723,458 | 2/1988 | Blok | 74/471 X |
| 4,763,100 | 8/1988 | Wood | 338/128 |
| 4,793,198 | 12/1988 | Myer | 74/110 |
| 4,849,583 | 7/1989 | Meyer | 74/471 X |
| 4,879,556 | 11/1989 | Duimel | 341/20 |
| 4,977,397 | 12/1990 | Kuo et al. | 340/710 |
| 5,008,497 | 4/1991 | Asher | 178/18 |
| 5,043,709 | 8/1991 | Kim | 345/161 |
| 5,087,904 | 2/1992 | DeVolpi | 338/128 |
| 5,140,313 | 8/1992 | Wen | 345/161 |
| 5,159,159 | 10/1992 | Asher | 178/18 |
| 5,176,041 | 1/1993 | Meier et al. | 74/471 X |
| 5,225,831 | 7/1993 | Osborn | 341/20 |
| 5,287,121 | 2/1994 | Louis et al. | 345/179 |

OTHER PUBLICATIONS

International Publication Number WO 92/09996, International Publication Date Jun. 11, 1992, by J. D. Rutledge et al, entitled "Analog Input Device Located In The Primary Typing Area Of A Keyboard".

Primary Examiner—Tommy P. Chin
Assistant Examiner—Doon Chow
Attorney, Agent, or Firm—Frank C. Leach, Jr.

[57] ABSTRACT

A pointing stick, which is used to control the position of a cursor on a computer monitor, has its axial longitudinal position relative to its fixed cover adjusted so that a flat bottom surface of a pad on the bottom of the pointing stick does not exert a force on a flat sensing surface, which produces electrical signals in accordance with where the flat bottom surface of the pad engages it when the pointing stick is moved and the force with which it is engaged, unless a user moves the pointing stick. This adjustment is accomplished during assembly through four equally spaced angularly groups of teeth on the pointing stick cooperating with four equally angularly spaced detents on a fixed support cover for the pointing stick. The teeth of each group are of varying length in a direction parallel to the longitudinal axis of the pointing stick from a minimum at one end to a maximum at the other so that a tooth of the same length of each group engages one of the detents at the same time. This varying length of each tooth of a group enables the pointing stick to be moved axially by rotation until an assembler determines by the absence of the electrical signals that no force is exerted on the force sensor by the pointing stick when the pointing stick is at rest.

13 Claims, 5 Drawing Sheets

ADJUSTABLE POINTING STICK ASSEMBLY

FIELD OF THE INVENTION

This invention relates to an arrangement for adjusting the position of a pointing stick within its cover during assembly for cooperation with a force sensor and, more particularly, to an arrangement for adjusting a pointing stick during assembly to prevent the pointing stick from exerting a force on a force sensor when the pointing stick is at rest.

Pointing sticks are employed to control the movement of a cursor on a computer monitor. The pointing stick is mounted in a support so that the pointing stick has various degrees of freedom of motion whereby the cursor may be moved in any direction on the computer monitor. This is accomplished by the pointing stick having a substantially flat bottom surface engaging a force sensor, which produces electrical signals to move the cursor in accordance with where the sensor is engaged by the flat bottom surface of the pointing stick and the magnitude of the force applied to the force sensor through the pointing stick.

With a relatively small keyboard as in a notebook computer, for example, it is particularly desirable to have a pointing stick for moving the cursor. This is because space is limited on a keyboard of a notebook computer so that it is not desired to use space for a mouse, for example, for moving the cursor. As a result of having the pointing stick located on a keyboard of a notebook computer between keys as shown in PCT international application of Joseph Rutledge et al, International Publication No. WO 92/09996, published Jun. 11, 1992, for example, a user of a notebook computer desires the same pointing stick on a keyboard of a desk computer.

When the pointing stick is positioned within a cover, which is fixed to a support base supporting a force sensor, during assembly, the pointing stick must be positioned so that the pointing stick does not exert a force on the force sensor when the pointing stick is at rest while still having its force sensor engaging surface as close as possible to the force sensor to reduce travel of the pointing stick to a minimum before the pointing stick exerts a force on the force sensor. It is difficult, if not impossible in some situations, to control tolerances of the cover and the pointing stick so that the pointing stick is not positioned to exert a force on the force sensor when the pointing stick is at rest and still have minimum travel of the pointing stick from its rest position until it exerts a force on the force sensor. Accordingly, if the tolerances of the pointing stick and the cover are not satisfactory, the pointing stick will transmit a force to the force sensor when a user is not exerting a force on the pointing stick whereby the force sensor would produce electrical signals to cause the cursor to be inadvertently moved.

To reduce lost motion of the pointing stick to a minimum, it is desired that the pointing stick be as close as possible to the force sensor when the pointing stick is at its rest position without the pointing stick exerting a force on the force sensor so that travel of the pointing stick from its rest position until it exerts a force on the force sensor is a minimum. As the amount of travel of the pointing stick from its rest position until the pointing stick exerts a force on the force sensor increases, lost motion of the pointing stick occurs so that the cursor does not move as quickly as a user desires or a greater force must be applied by a user to produce the desired cursor speed.

As the amount of travel of the pointing stick from its rest position until the pointing stick exerts a force on the force sensor increases, the angle at which a substantially flat bottom surface of the pointing stick engages a substantially flat top surface of the force sensor increases to produce less change in the position of the cursor on the computer monitor than is desired by a specific motion of the pointing stick.

It has previously been suggested to precisely machine the substantially flat bottom surface of the pointing stick and have the machined surface engage the force sensor, which is fixed to a printed circuit board. This is an expensive arrangement for controlling the position of the force engaging surface of the pointing stick to a desired minimum.

SUMMARY OF THE INVENTION

The pointing stick assembly of the present invention obtains a desired minimum travel of the pointing stick from its rest position until the pointing stick exerts a force on the force sensor at a substantially less cost without any machining. The position of the pointing stick for minimum travel from its rest position is obtained during assembly through moving the pointing stick axially in incremental steps relative to the portion of the cover having an opening through which the pointing stick extends and retaining the pointing stick in its adjusted position.

The minimum travel position of the pointing stick can be determined by an assembler. This is because electrical signals are produced by the force sensor when a substantially flat bottom surface of a pad on the bottom of the pointing stick exerts a force on a sensor surface when no movement of the pointing stick is occurring. This occurs because the lack of a minimum gap or clearance between the pointing stick and the cover portion having the opening through which the pointing stick extends causes the pointing stick to exert a downward force through the substantially flat bottom surface of the pad engaging the force sensor.

Therefore, relatively easy determination of where to dispose the pointing stick relative to the cover portion is obtained. When electrical signals are produced by the force sensor, the pointing stick is moved axially one incremental step away from the force sensor; this usually produces a rest position of the pointing stick so that no electrical signals are produced by the force sensor when the pointing stick is at its rest position with no movement of the pointing stick.

In the preferred embodiment, the axial incremental steps of the pointing stick are created by having a plurality of equally angularly spaced groups of teeth. The teeth in each group vary in length, which is in a direction parallel to the longitudinal axis of the pointing stick from the bottom of the pointing stick, from a minimum to a maximum. Each group of the teeth, which preferably are mounted in a circle on the pointing stick, cooperate with the same number of detents (preferably four groups of teeth cooperate with four detents) in a circle on a cover, which rotatably supports the pointing stick. Thus, rotation of the pointing stick relative to the cover changes the axial position of the pointing stick relative to the cover through axial motion of the pointing stick due to changing the tooth engaging the detent.

The force sensor is preferably supported by a base, which is fixed to the support cover for the pointing stick. The base is preferably mounted on a keyboard through the base having precisely located holes to receive upstanding studs or pins on the keyboard whereby the pointing stick is positioned between specific character keys, namely, G, H, and B, on the keyboard.

An object of this invention is to adjust the axial position of a pointing stick relative to its support cover during assembly to enable precise controlling of the movement of a cursor of a computer monitor during use.

Other objects of this invention will be readily perceived from the following description, claims, and drawings.

DETAILED DESCRIPTION

Figure 1:
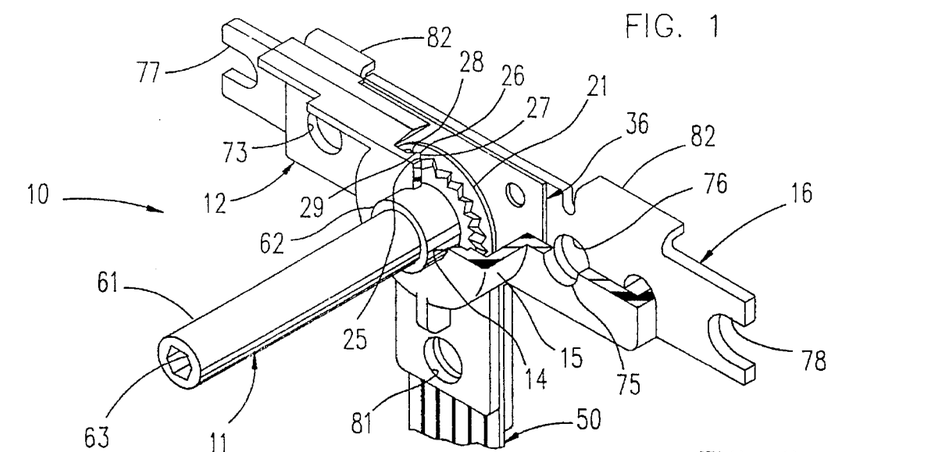
FIG. 1 is a perspective view, partly in section, of a pointing stick assembly of the present invention in a horizontal position for clarity purposes rather than in its vertical operating position.

Referring to the drawings and particularly FIG. 1, there is shown a pointing stick assembly 10 of the present invention. The pointing stick assembly 10 includes a pointing stick 11, which is rotatably supported by a cover 12. The pointing stick 11 extends through an opening 14 in a cap 15 of the cover 12. Both the pointing stick 11 and the cover 12 are formed of plastic. One suitable example of the plastic is glass-filled polycarbonate.

Figure 2:
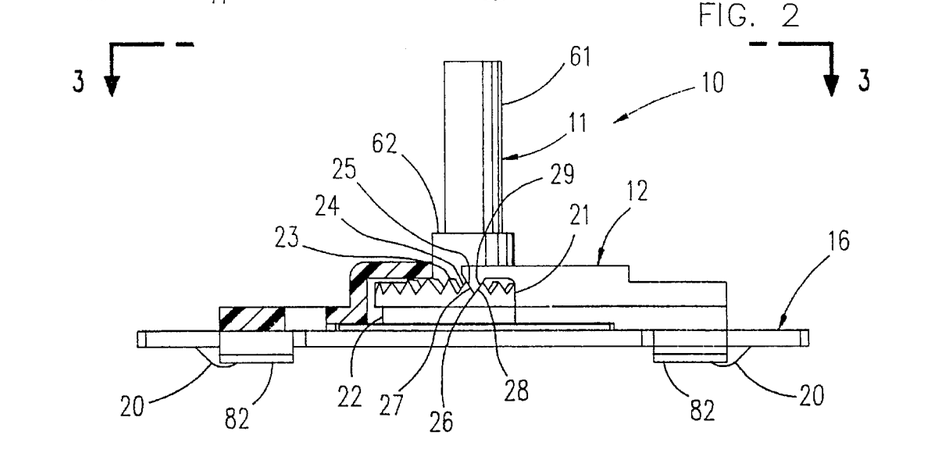
FIG. 2 is a front elevational view, partly in section, of the pointing stick assembly in its operating position.
Figure 3:
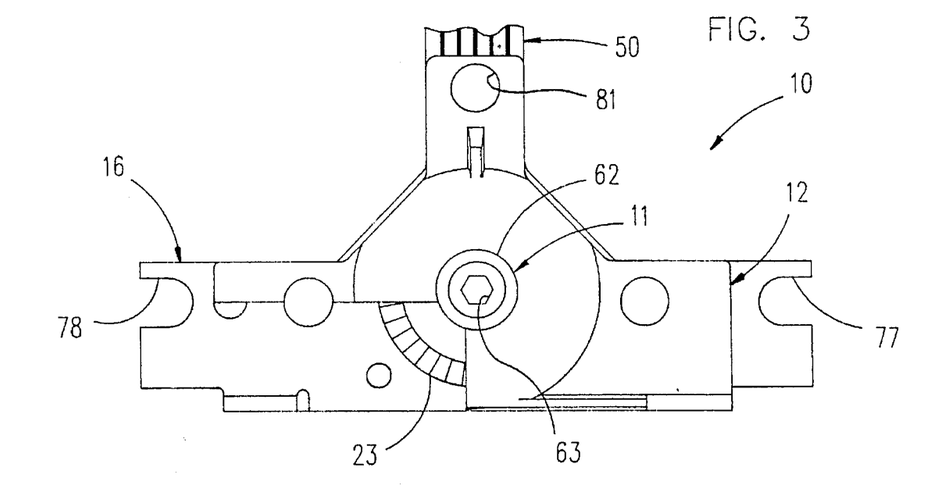
FIG. 3 is a top plan view, partly broken, of the pointing stick assembly taken along line 3—3 of FIG. 2.
Figure 8:
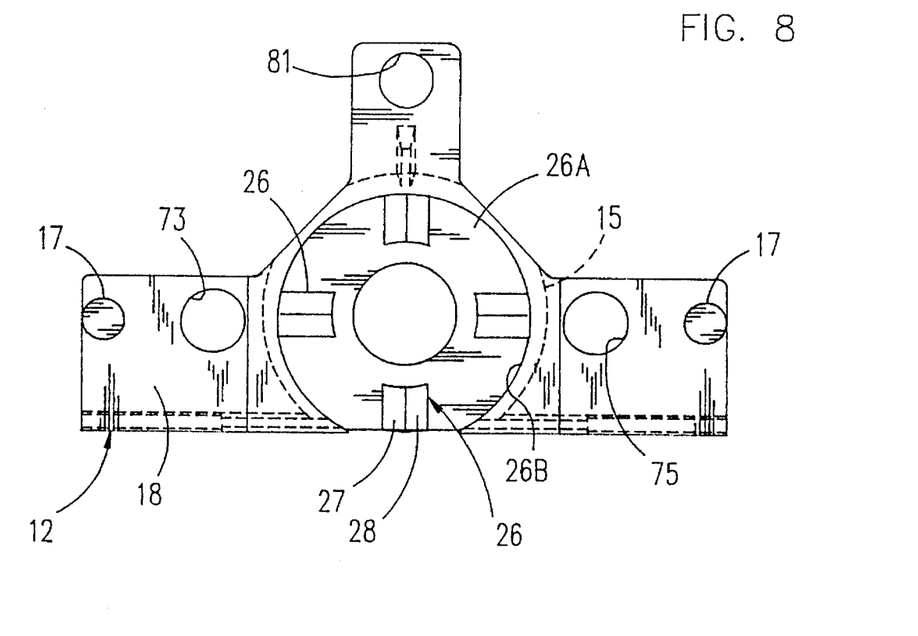
FIG. 8 is a bottom plan view of a cover of the pointing stick assembly.

The cover 12 is attached to a support base 16, which is metal. As shown in FIG. 8, the cover 12 has a pair of pins or studs 17 extending from a flat surface 18. The studs 17 extend through a pair of openings 19 (see FIG. 9) in the support base 16. After passing through the openings 19 in the support base 16, the studs 17 (see FIG. 8) are heated and subjected to deformation by a force applied thereto to form rivet heads 20 (see FIG. 2) to connect the support base 16 and the cover 12 to each other.

Figure 7:
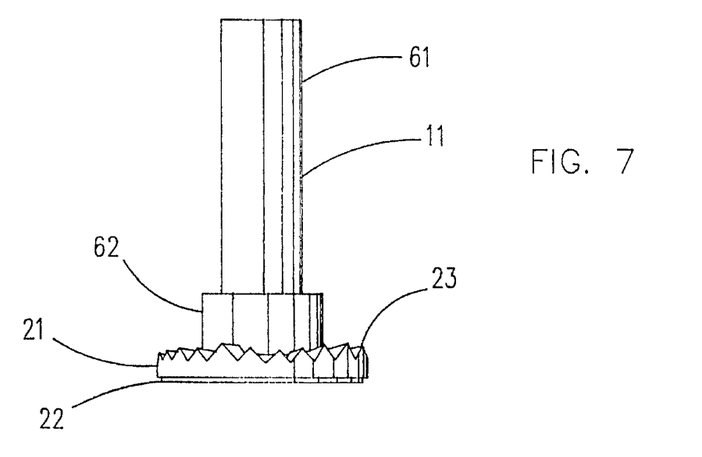
FIG. 7 is a side elevational view of the pointing stick.

Before connecting the cover 12 and the support base 16 to each other, the pointing stick 11 is positioned in the opening 14 (see FIG. 1) in the cap 15. As shown in FIG. 7, the pointing stick 11 includes a base 21 having an elastomeric pad 22 attached to its bottom surface by any suitable means such as an adhesive, for example. The pad 22, which is preferably formed of urethane rubber, has a slightly smaller diameter than the base 21 of the pointing stick 11.

Figures 4, 5:
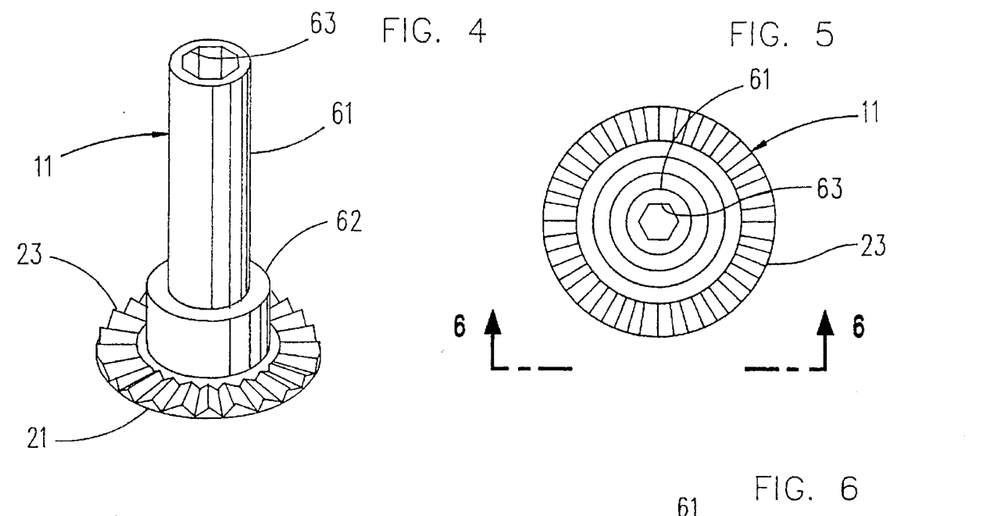
FIG. 4 is a perspective view of a pointing stick of the pointing stick assembly.
FIG. 5 is a top plan view of the pointing stick of FIG. 4.

The base 21 has its upper surface formed with a plurality of teeth 23. The teeth 23 are divided into four equally angularly spaced groups as shown in FIG. 5. The groups of the teeth 23 are formed in a circle having the longitudinal axis of the pointing stick 11 as its center. The teeth 23 in each of the four groups increase in length from one end of each group to the other.

Figure 6:
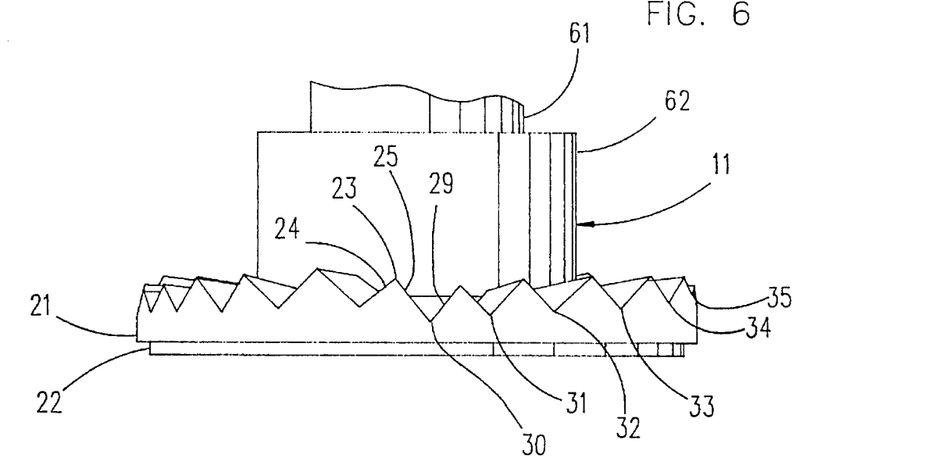
FIG. 6 is an enlarged fragmentary side elevational view of the pointing stick taken along line 6—6 of FIG. 5.

As shown in FIG. 6, one of the teeth 23 has its surfaces 24 and 25 intersecting at a right angle as do each of the other teeth 23. Each group of the teeth 23 cooperates with one of a plurality of equally angularly spaced detents 26 (see FIG. 8), which are equal in number to the number of the groups of the teeth 23 (see FIG. 5). Thus, with the pointing stick 11 having four groups of the teeth 23, there are four of the detents 26 (see FIG. 8).

The detents 26 are formed in a circle on a substantially flat, inner surface 26A of the cap 15 of the cover 12. The outer edges of three of the four detents 26 engage an inner arcuate side wall 26B of the cap 15 of the cover 12. The fourth detent 26 is positioned between the ends of the inner arcuate side wall 26B.

It should be understood that the number of groups of the teeth 23 (see FIG. 6) do not have to be four. However, there must be at least three groups of the teeth 23 with a corresponding number of the detents 26 (see FIG. 8). With three of the detents 26, the detents 26 will be spaced 120° from each other. With three groups of the teeth 23 (see FIG. 5), each group of the teeth 23 would extend for 120°.

As shown in FIG. 1, each of the detents 26 has intersecting surfaces 27 and 28, which are perpendicular to each other. The surface 27 of the detent 26 bears against the surface 25 of one of the teeth 23 and the surface 28 of the detent 26 bears against a surface 29 (see FIG. 6) of the next adjacent of the teeth 23. The surfaces 25 and 29 intersect each other at the valley of the two adjacent teeth 23 and are perpendicular to each other.

The intersection of the surface 25 (see FIG. 6) of one of the teeth 23 and the surface 29 of the next adjacent of the teeth 23 at the valley of the two adjacent teeth 23 is at a point 30, which is a minimum distance from the bottom of the base 21 of the pointing stick 11. Thus, when the surfaces 27 (see FIG. 1) and 28 of each of the detents 26 are engaging the surfaces 25 (see FIG. 6) and 29, respectively, of two of the adjacent teeth 23 of each of the groups, the detent 26 (see FIG. 1) is at a minimum distance from the bottom of the base 21 of the pointing stick 11.

The distance of each of intersecting points 31 (see FIG. 6), 32, 33, 34, and 35, which are at the valleys of two of the adjacent teeth 23, of one group of the teeth 23 from the bottom of the base 21 of the pointing stick 11 increases incrementally from the point 31 to the point 35. The intersecting point 35 is the maximum distance for each group of the teeth 23 from the bottom of the base 21 of the pointing stick 11. Therefore, when the point 35 of each group of the teeth 23 is engaged by one of the detents 26 (see FIG. 2), the detent 26 is a maximum distance from the bottom of the base 21 of the pointing stick 11 so that there is a maximum distance between the base 21 of the pointing stick 11 and the substantially flat, inner surface 26A (see FIG. 8) of the cap 15 of the cover 12.

As one example, the point 30 (see FIG. 6) is 0.4 mm from the bottom of the base 21 of the pointing stick 11, and the points 31, 32, 33, 34, and 35 are 0.46 mm, 0.52 mm, 0.58 mm, 0.64 mm, and 0.7 mm, respectively, from the bottom of the base 21 of the pointing stick 11. The tooth 23, which is formed between the points 34 and 35, is a distance of 1.38 mm from the bottom of the base 21 of the pointing stick 11 and is the tooth 23 of each of the groups with the greatest length.

Figures 10, 12:
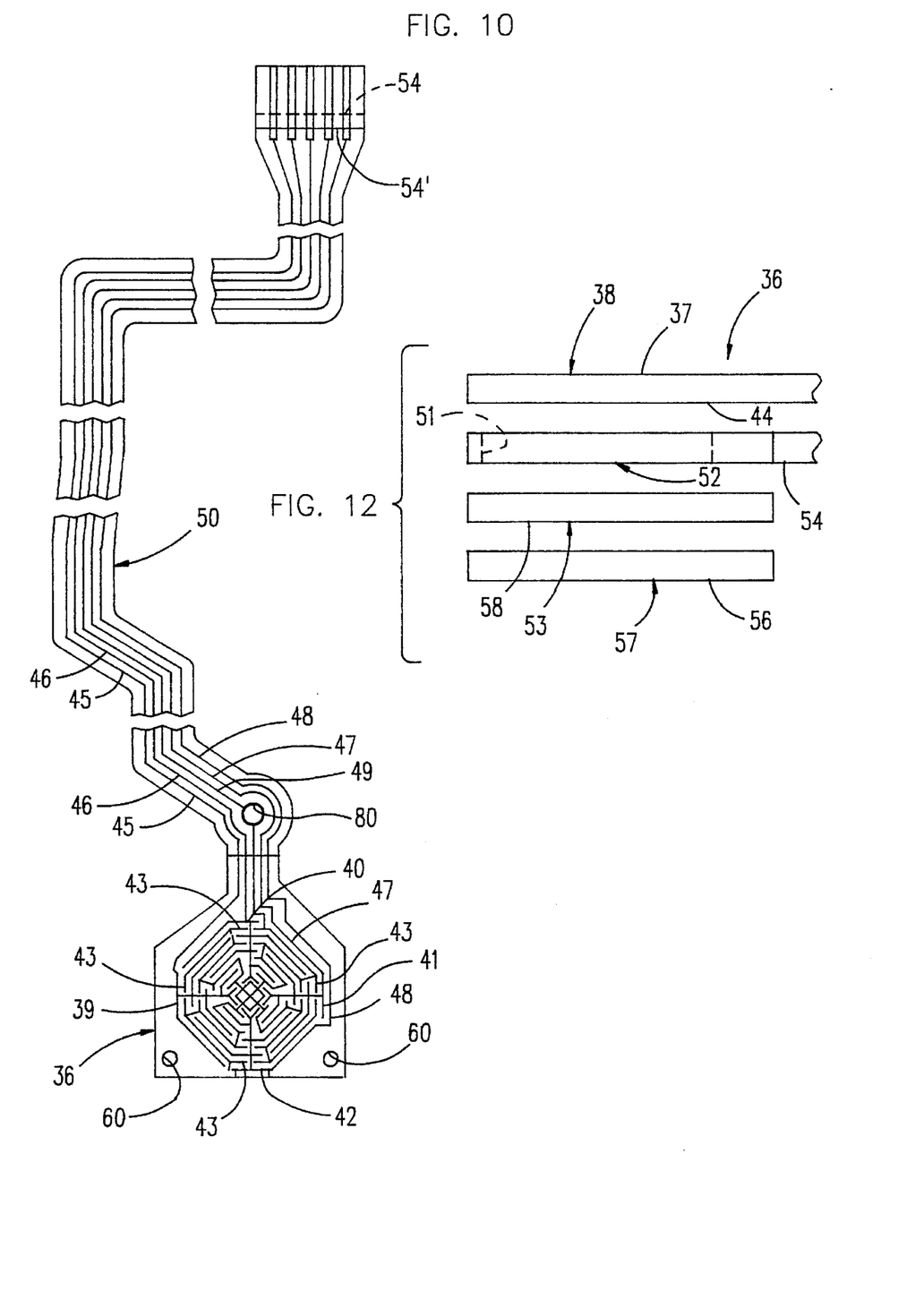
FIG. 10 is an enlarged fragmentary top plan view of a force sensor of the pointing stick assembly and its electrical leads.
FIG. 12 is fragmentary schematic elevational view of portions of the force sensor with which the pointing stick cooperates.

When the surfaces 27 (see FIG. 1) and 28 of each of the detents 26 are engaging the surfaces 25 (see FIG. 6) and 29, respectively, of two of the adjacent teeth 23 of each of the groups in one of the axial positions of the pointing stick 11, the pad 22 is disposed to not exert a force on a force sensor 36 (see FIG. 10). The force sensor 36 produces electrical signals to indicate where a force is applied to the force sensor 36 and its magnitude. The force is applied by engagement of the pad 22 (see FIG. 7) on the bottom of the pointing stick 11 with a top surface 37 (see FIG. 12) of a layer 38 of a transparent plastic of the force sensor 36.

The layer 38 has electrical contacts 39 (see FIG. 10), 40, 41, 42, and 43 arranged in its bottom surface 44 (see FIG. 12) in a predetermined pattern. Because the layer 38 is transparent, the contacts 39–43 can be seen in FIG. 10 and are on axes perpendicular to each other, and the contacts 43 are disposed between each adjacent pair of the contacts 39, 40, 41, and 42. The contacts 39, 40, 41, 42, and 43 are connected to electrical leads 45, 46, 47, 48, and 49, respectively. The leads 45–49 are disposed within a flexible pigtail 50, which includes the transparent plastic layer 38 (see FIG. 12).

When force is applied to the surface 37 of the layer 38, some of the contacts 39–43 (see FIG. 10) pass through an opening 51 (see FIG. 12) in a spacer adhesive layer 52, which joins the layer 38 to a layer 53 of a transparent plastic such as Mylar, for example, having a semiconductor material on its side adjacent the spacer adhesive layer 52, to contact portions of the semiconductor material on the layer 53.

Depending on the force produced and where it is applied, portions of the semiconductor material on the layer 53 will be compressed to reduce the resistance between the lead 49 (see FIG. 10) and at least one of the leads 45–48. The leads 45–49 are connected to circuitry, which controls the position of a cursor on a computer monitor.

The flexible pigtail 50 has a stiffener layer 54 (see FIG. 12), which is Mylar, adhered thereto on the opposite side from the layer 38 by an adhesive. As shown in FIG. 10, a stiffener layer 54', which is Mylar, is on the opposite side of the flexible pigtail 50 from the layer 54 and extends to the free end of the flexible pigtail 50 after the layer 38 (see FIG. 12) terminates.

It should be understood that the layers 38, 52, and 53, the stiffener layer 54, the opening 51 in the layer 52, and an adhesive layer 57 are not shown with relative sizes for clarity purposes.

The base 21 (see FIG. 7) of the pointing stick 11 is as large as possible to enable the area of the teeth 23 to be as large as possible. Since the pointing stick 11 is as large as possible, the pad 22 has a diameter smaller than the opening 51 (see FIG. 12) in the spacer adhesive layer 52 so as to not act on the spacer adhesive layer 52. This enables the pad 22 (see FIG. 7) to exert a force on the semiconductor material on the layer 53 (see FIG. 12) through the pad 22 (see FIG. 7) acting on the layer 38 (see FIG. 12) of transparent plastic.

The force sensor 36 is adhered to a flat surface 55 (see FIG. 9) of the support base 16 by a bottom flat surface 56 (see FIG. 12), which has a peel off backing thereon, of the adhesive layer 57, which is adhered to a surface 58 of the layer 53. The support base 16 (see FIG. 9) has two locator holes 59 for positioning on two locator pins on a fixture to specifically locate the support base 16 on the fixture. As shown in FIG. 10, the force sensor 36 has two locator holes 60 to fit over the two locator pins on the fixture passing through the two locator holes 59 (see FIG. 9) in the support base 16. This arrangement precisely positions the force sensor 36 (see FIG. 10) in the desired position on the flat surface 55 (see FIG. 9) of the support base 16. The adhesive layer 57 (see FIG. 12) of the force sensor 36 has its surface 56 adhered to the flat surface 55 (see FIG. 9) of the support base 16 after being disposed on the two locator pins of the fixture.

The pointing stick 11 (see FIG. 7) has a cylindrical portion 61 with an enlarged locator collar 62 adjacent the teeth 23. As shown in FIG. 1, the locator collar 62 extends through the opening 14 in the cap 15 of the support base 16.

After the flat surface 55 (see FIG. 9) of the support base 16 has the force sensor 36 (see FIG. 10) adhered thereto in the fixture having the two locator pins, the cover 12 (see FIG. 1), which rotatably supports the pointing stick 11 and allows movement of the pointing stick 11 in a plurality of degrees of freedom so that the pointing stick 11 can move in any direction through 360°, is positioned with the two studs or pins 17 (see FIG. 8) disposed in the two openings 19 (see FIG. 9) in the support base 16. Then, heat is applied to cause the pins 17 (see FIG. 8) to be capable of being deformed by force to form the rivet heads 20 (see FIG. 2).

Then, the pointing stick 11 (see FIG. 4) is turned about its longitudinal axis manually by the assembler or through disposing a hexagonal wrench, for example, within a hex opening 63 in the top of the pointing stick 11. This turning produces the desired axial position of the pointing stick 11 within the cover 12 (see FIG. 1).

When the pointing stick 11 can no longer be turned to increase the distance between the bottom of the base 21 of the pointing stick 11 and the detents 26 on the cover 12, the pad 22 (see FIG. 7) has its bottom surface engaging the force sensor 36 (see FIG. 10). When this occurs, the force sensor 36 provides electrical signals over the electrical leads 45–49. The electrical signals from the force sensor 36 indicate motion of the pointing stick 11 (see FIG. 7) when there is no motion; this indicates that the pointing stick 11 is axially positioned so that the pad 22 is exerting a force on the force sensor 36 (see FIG. 10). As a result, the pointing stick 11 (see FIG. 7) is rotated in the opposite direction about its longitudinal axis by the assembler. Usually, only rotation in the opposite direction for the distance of one of the teeth 23 (see FIG. 2) of each of the groups past each of the detents 26 will provide the desired axial position of the pointing stick 11 at which the force sensor 36 (see FIG. 10) does not produce electrical signals when there is no motion of the pointing stick 11 (see FIG. 1).

The pointing stick assembly 10 is mounted on a tilted frame 63' (see FIG. 11) of a keyboard 64 between character keys 65, 66, and 67 for characters B, G, and H, respectively. This enables the pointing stick 11 to be activated by a touch typist since the pointing stick 11 can be reached by either of the index fingers of the user.

Figure 11:
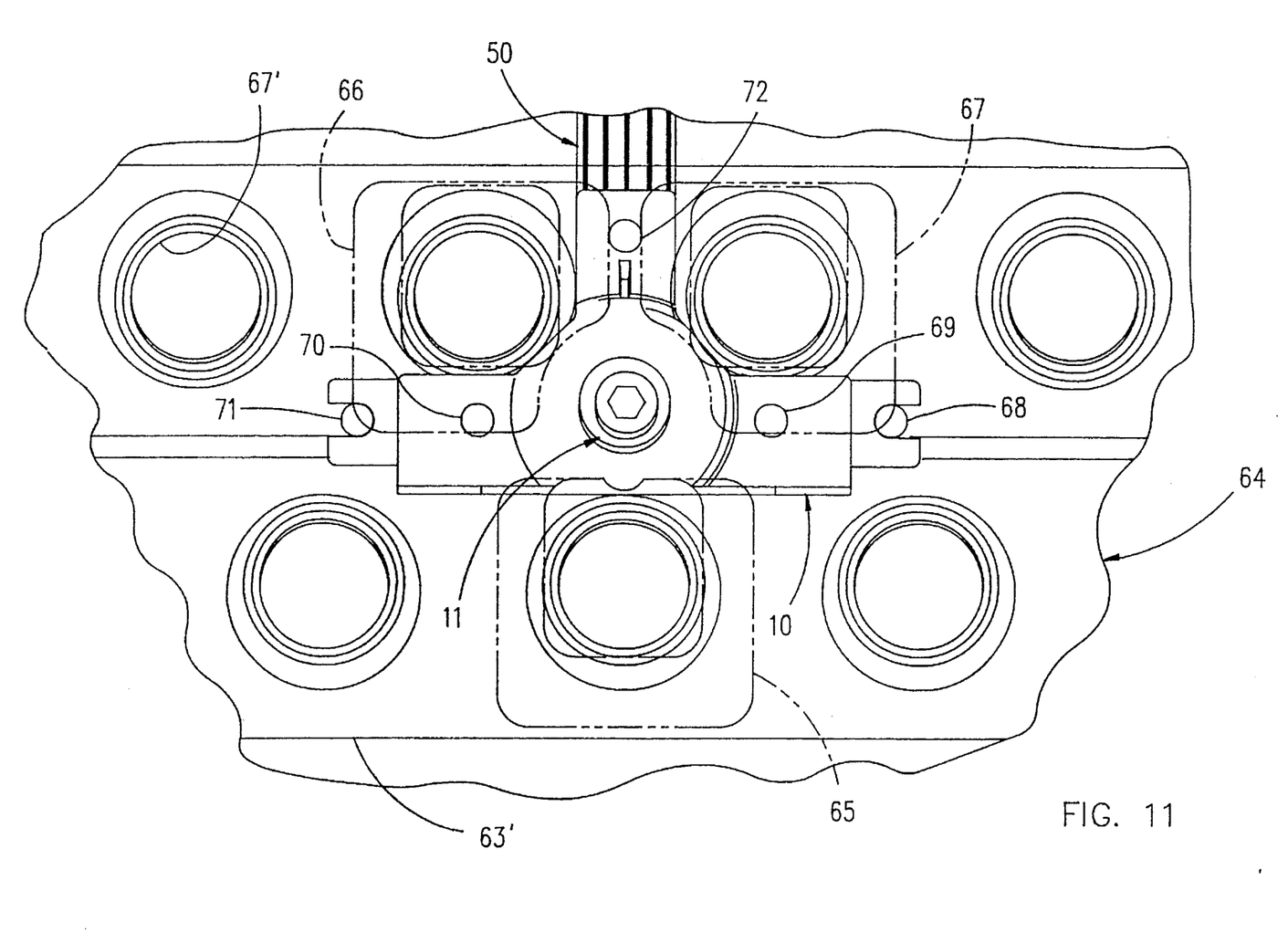
FIG. 11 is a fragmentary top plan view of a portion of a keyboard having the pointing stick assembly mounted thereon.

The tilted frame 63' of the keyboard 64 has chimneys 67', which are hollow cylindrical portions extending upwardly, for supporting each key including the character keys 65–67 in the well-known manner. A spring (not shown) biases the key within each of the chimneys 67' upwardly to its rest position in the well-known manner until it is depressed by a user.

The keyboard frame 63' has five upstanding pins 68, 69, 70, 71, and 72. The pin 69 extends through aligned holes 73 (see FIG. 1) in the cover 12 and 74 (see FIG. 9) in the support base 16. Similarly, the pin 70 (see FIG. 11) extends through aligned holes 75 (see FIG. 1) in the cover 12 and 76 in the support base 16.

A cutout 77 in the support base 16 surrounds a portion of the pin 68 (see FIG. 11). A cutout 78 (see FIG. 9) in the opposite end of the support base 16 surrounds a portion of the pin 71 (see FIG. 11).

The pin 72 extends through a hole 79 (see FIG. 9) in the support base 16, a hole 80 (see FIG. 10), which has the electrical lead 49 extending from the force sensor 36 pass around it, and a hole 81 (see FIG. 1) in the cover 12.

Figure 9:
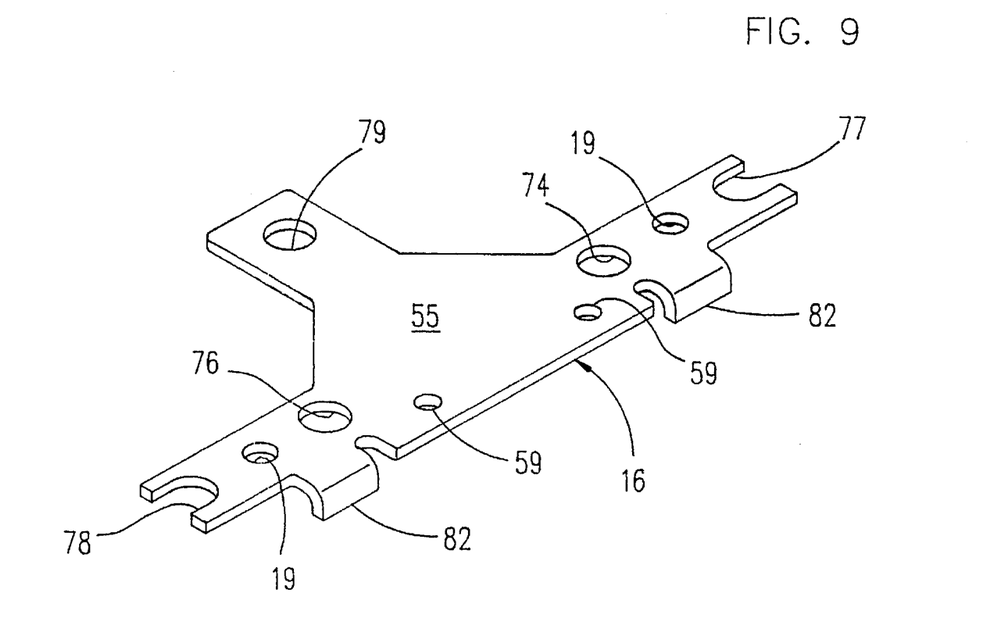
FIG. 9 is a perspective view of a support base of the pointing stick assembly.

As shown in FIG. 9, the support base 16 has a pair of ears 82, which extend downwardly when the pointing stick assembly 10 (see FIG. 1) is positioned on the pins 68–72 (see FIG. 11) of the keyboard 64. The ears 82 (see FIG. 1) enable the pointing stick 11 to be centered between the character keys 65–67 (see FIG. 11).

Accordingly, with the pointing stick assembly 10 (see FIG. 1) mounted on the keyboard 64 (see FIG. 11), movement of the pointing stick 11 in any direction will cause the force sensor 36 (see FIG. 10) to transmit electrical signals over the electrical leads 45–49 to control the position of the cursor on the computer monitor through appropriate circuitry. The force sensor 36 increases the speed movement of the cursor as force is increased on the force sensor 36 through the pointing stick 11 (see FIG. 1).

While four of the groups of the teeth 23 (see FIG. 5) are preferred, a minimum of three of the groups of teeth 23 is required. The maximum number of the equally angular groups of the teeth 23 would depend upon each of the teeth 23 having a sufficient width to cooperate with the detents 26 (see FIG. 1), which are equal to the number of the groups.

While the detents 26 have been shown and described as mounted on the cover 12 and the teeth 23 (see FIG. 4) have been shown and described as mounted on the base 21 of the pointing stick 11, it should be understood that the teeth 23 could be mounted on the cover 12 (see FIG. 1) and the detents 26 on the pointing stick 11. It is only necessary that rotation of the pointing stick 11 create axial motion of the pointing stick 11 along its longitudinal axis relative to the cover 12.

While the force sensor 36 (see FIG. 10) has been described as using force sensing resistors, any other suitable means for sensing forces created by motion of the pointing stick 11 (see FIG. 1) may be employed. For example, as described in the aforesaid Rutledge et al application, piezoresistive sensors or resistive fluid sensors could be employed instead of the force sensing resistors of the force sensor 36 (see FIG. 10).

As used in the claims, the term "axial rest position" is the axial position at which the pointing stick 11 (see FIG. 1) is at rest and to which the pointing stick 11 is moved by the adjusting means.

An advantage of this invention is that it provides an inexpensive means for controlling the position of an adjustable pointing stick during its assembly. Another advantage of this invention is that it prevents false movement of a cursor.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

What is claimed is:

1. An adjustable pointing stick assembly including:

a pointing stick having a substantially flat bottom surface and a longitudinal axis;

support means for supporting said pointing stick while enabling movement of said pointing stick in a plurality of degrees of freedom relative to said support means including axial movement of said pointing stick;

force sensing means including means fixed with respect to said support means and means movable by said pointing stick relative to said fixed means when said pointing stick is moved relative to said support means;

said force sensing means producing electrical signals responsive to movement of said movable means by said pointing stick to cause controlled movement of a cursor of a computer monitor in response to motion of said pointing stick;.

adjusting means for adjusting the axial position of said pointing stick along the longitudinal axis of said pointing stick relative to said support means;

said adjusting means including cooperating means on said pointing stick and said support means for changing the axial position of said pointing stick relative to said support means during assembly;

and said cooperating means producing adjustment of the axial position of said pointing stick through rotation of said pointing stick relative to said support means.

2. The assembly according to claim 1 in which said cooperating means on said pointing stick and said support means includes:

at least three equally angularly spaced detents on one of said pointing stick and said support means, said detents being on a circle having the longitudinal axis of said pointing stick as its center;

at least three equally angularly spaced groups of teeth on the other of said pointing stick and said support means and being on a circle having the longitudinal axis of said pointing stick as its center, each of said groups having the teeth vary in length in a direction parallel to the longitudinal axis of said pointing stick and increase incrementally in length from one end of said group to its other end;

and each of said groups of teeth having the same number of teeth with the same length tooth in each of said groups engaging one of said detents at the same time.

3. The assembly according to claim 2 in which: said detents are on said support means; and said groups of teeth are on said pointing stick.

4. The assembly according to claim 3 including:

mounting means for mounting said force sensing means, said mounting means being fixed to said support means;

and said movable means of said force sensing means including a substantially flat surface supported by said mounting means.

5. The assembly according to claim 4 in which:

said substantially flat bottom surface of said pointing stick has an elastomeric element thereon;

said elastomeric element is a smaller diameter than said substantially flat bottom surface of said pointing stick;

and said elastomeric element engages said substantially flat surface of said movable means of said force sensing means when said pointing stick is moved to move said substantially flat surface of said movable means to cause electrical signals to be produced by said force sensing means in accordance with where said elastomeric element engages said substantially flat surface of said movable means to apply a force and the magnitude of the applied force.

6. The assembly according to claim 3 in which:

said substantially flat bottom surface of said pointing stick has an elastomeric element thereon;

said elastomeric element is a smaller diameter than said substantially flat bottom surface of said pointing stick;

and said elastomeric element engages said movable means of said force sensing means when said pointing stick is moved to move said movable means to cause electrical signals to be produced by said force sensing means in accordance with where said elastomeric element engages said movable means to apply a force and the magnitude of the applied force.

7. The assembly according to claim 2 including: mounting means for mounting said force sensing means, said mounting means being fixed to said support means;

and said movable means of said force sensing means including a substantially flat surface supported by said mounting means.

8. The assembly according to claim 7 in which:

said substantially flat bottom surface of said pointing stick has an elastomeric element thereon;

said elastomeric element is a smaller diameter than said substantially flat bottom surface of said pointing stick;

and said elastomeric element engages said substantially flat surface of said movable means of said force sensing means when said pointing stick is moved to move said substantially flat surface of said movable means to cause electrical signals to be produced by said force sensing means in accordance with where said elastomeric element engages said substantially flat surface of said movable means to apply a force and the magnitude of the applied force.

9. The assembly according to claim 2 in which:

said substantially flat bottom surface of said pointing stick has an elastomeric element thereon;

said elastomeric element is a smaller diameter than said substantially flat bottom surface of said pointing stick;

and said elastomeric element engages said movable means of said force sensing means when said pointing stick is moved to move said movable means to cause electrical signals to be produced by said force sensing means in accordance with where said elastomeric element engages said movable means to apply a force and the magnitude of the applied force.

10. The assembly according to claim 1 including:

mounting means for mounting said force sensing means, said mounting means being fixed to said support means;

and said movable means of said force sensing means including a substantially flat surface supported by said mounting means.

11. The assembly according to claim 10 in which:

said substantially flat bottom surface of said pointing stick has an elastomeric element thereon;

said elastomeric element is a smaller diameter than said substantially flat bottom surface of said pointing stick;

and said elastomeric element engages said substantially flat surface of said movable means of said force sensing means when said pointing stick is moved to move said substantially flat surface of said movable means to cause electrical signals to be produced by said force sensing means in accordance with where said elastomeric element engages said substantially flat surface of said movable means to apply a force and the magnitude of the applied force.

12. The assembly according to claim 1 in which:

said substantially flat bottom surface of said pointing stick has an elastomeric element thereon;

said elastomeric element is a smaller diameter than said substantially flat bottom surface of said pointing stick;

and said elastomeric element engages said movable means of said force sensing means when said pointing stick is moved to move said movable means to cause electrical signals to be produced by said force sensing means in accordance with where said elastomeric element engages said movable means to apply a force and the magnitude of the applied force.

13. An adjustable pointing stick assembly including:

a pointing stick having a substantially flat bottom surface and a longitudinal axis;

support means for supporting said pointing stick while enabling movement of said pointing stick in a plurality of degrees of freedom relative to said support means including axial movement of said pointing stick;

force sensing means including means fixed with respect to said support means and means movable by said pointing stick relative to said fixed means when said pointing stick is moved relative to said support means;

said force sensing means producing electrical signals responsive to movement of said movable means by said pointing stick to cause controlled movement of a cursor of a computer monitor in response to motion of said pointing stick;

adjusting means for adjusting the axial position of said pointing stick along the longitudinal axis of said pointing stick relative to said support means;

said adjusting means including cooperating means on said pointing stick and said support means for changing the axial position of said pointing stick relative to said support means;

and said cooperating means producing adjustment of the axial position of said pointing stick through rotation of said pointing stick relative to said support means.

\* \* \* \* \*